United States Patent
Zhang et al.

(10) Patent No.: US 11,175,772 B1
(45) Date of Patent: Nov. 16, 2021

(54) TOUCH ARRAY SUBSTRATE, TOUCH DISPLAY, AND DISPLAY DEVICE

(71) Applicant: WUHAN CHINA STAR OPTOELECTRONICS TECHNOLOGY CO., LTD., Hubei (CN)

(72) Inventors: Qipei Zhang, Hubei (CN); Yun Yu, Hubei (CN)

(73) Assignee: WUHAN CHINA STAR OPTOELECTRONICS TECHNOLOGY CO., LTD., Wuhan (CN)

(*) Notice: Subject to any disclaimer, the term of this patent is extended or adjusted under 35 U.S.C. 154(b) by 125 days.

(21) Appl. No.: 16/615,138

(22) PCT Filed: Oct. 11, 2019

(86) PCT No.: PCT/CN2019/110626
§ 371 (c)(1),
(2) Date: Nov. 20, 2019

(87) PCT Pub. No.: WO2020/258586
PCT Pub. Date: Dec. 30, 2020

(51) Int. Cl.
*G06F 3/041* (2006.01)
*G06F 3/044* (2006.01)
*G02F 1/1333* (2006.01)

(52) U.S. Cl.
CPC ........ *G06F 3/04164* (2019.05); *G06F 3/0412* (2013.01); *G06F 3/0446* (2019.05); *G02F 1/13338* (2013.01)

(58) Field of Classification Search
CPC .. G06F 3/04164; G06F 3/0446; G06F 3/0412; G02F 1/13338
See application file for complete search history.

(56) References Cited

U.S. PATENT DOCUMENTS

| | | | |
|---|---|---|---|
| 9,904,404 B2* | 2/2018 | Kang | G06F 1/3262 |
| 2014/0362042 A1* | 12/2014 | Noguchi | G06F 3/0412 345/174 |
| 2016/0098141 A1* | 4/2016 | Kang | G06F 3/041661 345/174 |

* cited by examiner

*Primary Examiner* — Peter D McLoone
(74) *Attorney, Agent, or Firm* — Soroker Agmon Nordman

(57) ABSTRACT

The invention provides a touch array substrate, a touch display, and a display device. The touch array substrate includes a driving circuit layer, a touch layer, and a sleep state voltage equalizing connecting unit which are mutually insulated. The driving circuit layer includes driving scanning lines, odd row driving data signal lines, and even row driving data signal lines. The touch layer comprises touch scanning lines, odd row touch data signal lines, and even row touch data signal lines. In a display sleep state, the sleep state voltage equalizing connecting unit enables mutual electrical connection of the odd row driving data signal lines, the even row driving data signal lines, the odd row touch data signal lines, and the even row touch data signal lines.

11 Claims, 4 Drawing Sheets

TOUCH ARRAY SUBSTRATE, TOUCH DISPLAY, AND DISPLAY DEVICE

BACKGROUND OF INVENTION

Field of Invention

The invention relates to the field of touch technology, in particular to a touch array substrate, a touch display and a display device.

Description of Prior Art

Liquid crystal displays (LCDs) are one of the most widely used flat panel displays and have gradually evolve into high-resolution color displays widely used on a variety of electronic devices, such as mobile phones, personal digital assistants (PDAs), digital cameras, computers, or laptops. With development of LCD technology, people request more on the quality, design, human-machine interface, and other aspects of liquid crystal display. Touch technology being beneficial for user operation convenience and high device integration has become a technology hot spot.

Touch panel technology has grown rapidly in recent year, and a variety of touch technologies have entered the mass production phase. Existing touch array substrates, touch displays, and display device technologies, depending on the position of the touch sensors, can be divided into three categories—out-cell, on-cell, and in-cell. Among them, in-cell refers to the method of embedding the touch panel function into the liquid crystal pixel, which not only further reduces the thickness of the end device, but also can be co-processed with LCDs during manufacturing, without either requiring extra production process, or causing any impact on visibility in outdoor and other bright environments. As a result, flourishing has been related researches on the integration of touch panel function with LCD panel, also known as in-cell technology.

As shown in FIG. 1, a structural diagram of an existing in-cell touch array substrate includes the following sections: a blackout layer 21, a buffer layer 22, an active layer 23, a gate insulation layer 24, a gate layer 25, an interlayer insulation layer 26, a source drain layer 27, a flat layer 28, a pixel electrode layer 29, where the touch layer 30 is located between the flat layer 28 and the pixel electrode layer 29, the touch layer 30 includes a plurality of touch electrode lines 31, an insulation layer 32, a self-capacitive touch electrode 33, a passivation layer 34 located on the flat layer 28, that is, and the pixel electrode layer 29 is located on the passivation layer 34. Each touch electrode wire 31 is connected to a self-capacitive touch electrode 33, and a through hole is arranged on the insulation layer 32, the touch electrode wire 31 connects to a corresponding self-capacitive touch electrode 33 through the through hole on the insulating layer 32, ameliorating crosstalk between different self-capacitive touch electrodes 33. The self-capacitive touch electrode 33 also includes a common electrode layer of the touch array substrate.

FIG. 2 is a diagram of the flat structure of an existing in-cell touch array substrate, which shows the way in which each of the touch electrode lines 31 connects to self-capacitive touch electrodes 33. During the display state, common electrode signals required for display are input to the plurality of touch electrode lines 31, resulting in common electrode signals on the respective self-capacitive touch electrode 33, and realizing displaying. In a touch scanning state, the touch electrode lines 31 are used as touch leads to connect to integrated circuit (IC) 35 to transmit inductive signals from self-capacitive touch electrodes 33 to the IC 35, for determination of the touch position, which in turn enables touch functionality.

As shown in FIG. 3, a diagram of the driving circuit structure of an existing in-cell touch array substrate is provided, where CT-DO (data odd representing odd data signal lines), CT-DE (data even representing even data signal lines), and CT-EN provide data signals (SD) for display. The data signals (SD) are shown as D(n+1), D(n+2), D(n+3), and D(n+4) in FIG. 3.

As shown in FIG. 4, a schematic diagram of a touch circuit of an existing in-cell touch array substrate is provided, TP-DO, TP-DE, and TP-EN provide touch signals (TP), or common voltage signals (VCOM), where the touch signals (TP) are shown as TP(n+1), TP(n+2), TP(n+3), and TP(n+4).

The in-cell touch array substrate as described above has one drawback—when the touch display enters a black screen for sleep, if the VCOM voltage is different from the SD voltage and induces an electric field, ions in the liquid crystal box condense, which will cause low grayscale whitening, and screen flickering.

Therefore, it is necessary to provide a new touch array substrate, a touch display, and a display device to overcome the existing problems in the arts.

SUMMARY OF INVENTION

The purpose of the invention is to provide a touch array substrate, touch display, and display device. A set of thin-film transistors (TFTs) and a sleep state voltage equalizing connecting unit are added to the circuit of a touch array substrate to ensure that the voltage level of the common voltage signal (VCOM) is identical to the voltage on the data signal (SD). The sleep state voltage equalizing connecting unit is formed from a switch driving line. The problem of low grayscale whitening and screen flicker due to the voltage difference can thus be avoided.

In order to solve the problems, the present invention provides a touch array substrate, including mutually insulated a driving circuit layer, a touch layer, and a sleep state voltage equalizing connecting unit. The driving circuit layer includes driving scanning lines, odd row driving data signal lines, and even row driving data signal lines. The driving scanning lines are electrically connected to a plurality of first thin-film transistors and a plurality of second thin-film transistors. Drain terminals of the first thin-film transistors are electrically connected to the odd row driving data signal lines, and drain terminals of the second thin-film transistors are electrically connected to the even row driving data signal lines. The touch layer comprises touch scanning lines, odd row touch data signal lines, and even row touch data signal lines. The touch scanning lines are electrically connected to a plurality of third thin-film transistors and a plurality of fourth thin-film transistors. Drain terminals of the third thin-film transistors are electrically connected to the odd row touch data signal lines, and drain terminals of the fourth thin-film transistors are electrically connected to the even row touch data signal lines. In a display sleep state, the sleep state voltage equalizing connecting unit enables mutual electrical connection of the odd row driving data signal lines, the even row driving data signal lines, the odd row touch data signal lines, and the even row touch data signal lines.

In particular, the sleep state voltage equalizing connecting unit comprises a fifth thin-film transistor, a sixth thin-film transistor, and at least one seventh thin-film transistor. Specifically, a source terminal of the fifth thin-film transistor is connected to the odd row driving data signal lines, and a drain terminal of the fifth thin-film transistor is connected to the odd row touch data signal lines. A source terminal of the sixth thin-film transistor is connected to the even row driving data signal lines, and a drain terminal of the sixth thin-film transistor is connected to the even row touch data signal lines. A source terminal of the at least one seventh thin-film transistor is connected to the odd row driving data signal lines or the odd row touch data signal lines, and a drain terminal of the at least one seventh thin-film transistor is connected to the even row driving data signal lines or the even row touch data signal lines. The data signal lines of the fifth thin-film transistor, the sixth thin-film transistor, and the seventh thin-film transistor are all connected to a switch driving line (TP-SW). The switch driving line is connected to a signal in display sleep state to enable mutual electrical connection of the odd row driving data signal lines, the even row driving data signal lines, the odd row touch data signal lines, and the even row touch data signal lines.

In particular, the switch driving line is connected to a driving integrated circuit.

In particular, the touch layer is located on one side of the driving circuit layer, and the sleep state voltage equalizing connecting unit is located on one side of the touch layer that is away from the driving circuit layer.

In particular, the touch layer is located on one side of the driving circuit layer, and the sleep state voltage equalizing connecting unit is located on one side of the driving circuit layer that is away from the touch layer.

In particular, a transistor selected from the first thin-film transistors, the second thin-film transistors, the third thin-film transistors, the fourth thin-film transistors, the fifth thin-film transistor, the sixth thin-film transistor, and the seventh thin-film transistor comprise a trench metal oxide semiconductor (NMOS), a P trench metal oxide semiconductor (PMOS), or a complementary metal oxide semiconductor (CMOS) transmission gate.

In particular, in a display state and in a touch scanning state, the switch driving line is connected to a signal, to make the sleep state voltage equalizing connecting unit enable mutual electrical insulation of the odd row driving data signal lines, the even row driving data signal lines, the odd row touch data signal lines, and the even row touch data signal lines.

Further, the touch layer comprises a layered touch electrode wire layer, an insulation layer, a self-capacitive touch electrode layer, and a passivation layer. Specifically, a touch electrode wire layer is located on the driving circuit layer. The insulation layer is located on the touch electrode wire layer with a through hole formed on the insulation layer. The self-capacitive touch electrode layer is located on the insulation layer and extended through the through hole to be electrically connected to the touch electrode wire layer. The self-capacitive touch electrode layer comprises the odd row touch data signal lines and the even row touch data signal lines. The passivation layer is located on the self-capacitive touch electrode layer.

In particular, the driving circuit layer includes a blackout layer, a buffer layer, an active layer, a gate insulation layer, a gate layer, a source drain layer, a flat layer, and a pixel electrode layer.

Specifically, the buffer layer is located on the blackout layer.

The active layer is located on the buffer layer.
The gate insulation layer is located on the active layer.

The gate layer is located on the gate insulation layer, and includes the driving scanning lines.

The source drain layer is located on the on the gate layer.
The flat layer is located on the source drain layer.
The pixel electrode layer is located on the flat layer, and includes the odd row driving data signal lines and the even row driving data signal lines.

The touch layer is located between the flat layer and the pixel electrode layer.

An alternative embodiment of the invention provides a touch display including the described touch array substrate A further embodiment of the invention provides a display device including the described touch display The beneficial effects of the present invention are: the present invention provides a touch array substrate, a touch display and display device. A sleep state voltage equalizing connecting unit is formed by adding a set of TFT and a switch driving line (TP-SW) to the circuit of the touch array substrate. The switch driving line TP-SW is connected from the driving integrated circuit. The touch scanning line (TP-EN), odd row touch data signal line (TP-DO), and even-row touch data signal line (TP-DE) provide touch signal (TP) or public voltage signal (VCOM) on the touch display. The driving scanning line (CT-EN), odd row driving data signal lines (CT-DO), even row driving data signal lines (CT-DE) to provide display data signals (SD). After the touch display enters the display sleep state, the LCD screen to conduct the added TFT via TP-SW, electrically connects all of CT-DO, CT-DE, TP-DO and TP-DE together, and connects signals to TFT of touch array substrate using CT-EN and TP-EN, thus to connect the source drain layer to the self-capacitive touch electrode. This ensures that voltage level on the common voltage signal (VCOM) is identical to the voltage level on the data signal (SD), avoiding the problem of low gray scale whitening and screen flicker due to the voltage difference.

BRIEF DESCRIPTION OF DRAWINGS

To clearly disclose the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF PREFERRED EMBODIMENTS

Technical schemes in embodiments of the present invention are clearly and comprehensibly described in the following accompany with the drawings. Obviously, the embodiments to be detailed are only illustrative rather than exhaustive description of embodiments of the present invention. Based on embodiments of the present invention, all other embodiments obtainable by a person having ordinary skills in the art without making creative labors should be construed as belonging to the scope of the claimed invention.

In the present invention, unless otherwise expressly specified and limited, the terms "installation", "connection", "connection", "fixation" and other terms shall be understood in a broad sense, to cover, for example, fixed connection, removable connection, integration to be a whole, mechanical connection, electrical connection, direct connection, indirect connection through an intermediate medium, interconnection within two components, or interaction between two components. A person with ordinary skills in the art may understand specific meaning of the terms in the present invention according to actual conditions.

Figure 5:
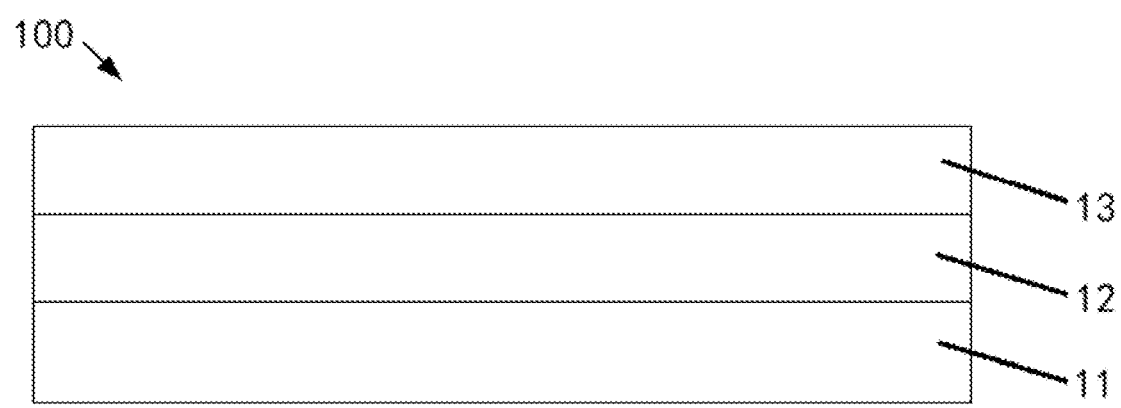
FIG. 5 is a diagram showing a structure of a touch array substrate in an embodiment of the present invention.

With reference to FIG. 5, one of the embodiments of the present invention provides a touch array substrate 100, including mutually insulated a driving circuit layer 11, a touch layer 12, and a sleep state voltage equalizing connecting unit 13.

In the embodiment, the touch layer 12 is located on one side of the driving circuit layer 11. The sleep state voltage equalizing connecting unit 13 is located on one side of the touch layer 12 that is away from the driving circuit layer 11. In an alternative embodiment, the sleep state voltage equalizing connecting unit 13 is located on one side of the driving circuit layer 11 that is away from the touch layer 12. Both of the two embodiments may realize the invention by fulfilling control functionality of sleep state voltage equalizing connecting unit 13.

Figure 6:
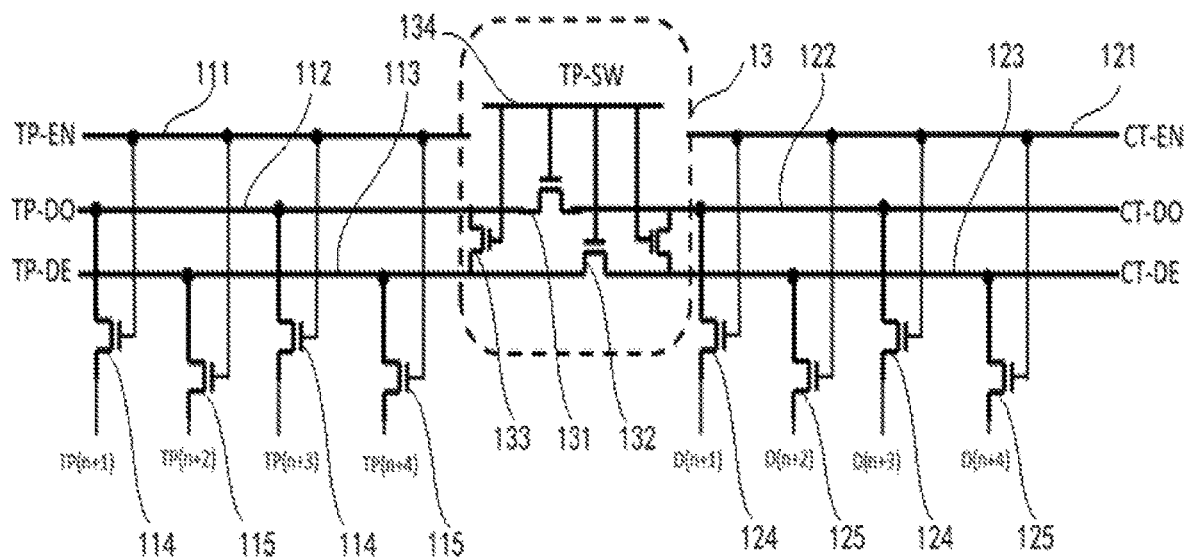
FIG. 6 is a diagram showing circuit architecture of a touch army substrate in an embodiment of the present invention.

With reference to FIG. 6, the driving circuit layer 11 includes driving scanning lines (CT-EN) 121, odd row driving data signal lines (CT-DO) 122, and even row driving data signal lines (CT-DE) 123. The driving scanning lines 121 are electrically connected to a plurality of first thin-film transistors 114 and a plurality of second thin-film transistors 115. Drain terminals of the first thin-film transistors 114 are electrically connected to the odd row driving data signal lines 122, and drain terminals of the second thin-film transistors 115 are electrically connected to the even row driving data signal lines 123.

The touch layer 12 comprises touch scanning lines (TP-EN) 111, odd row touch data signal lines (TP-DO) 112, even row touch data signal lines (TP-DE) 113. The touch scanning lines 111 are electrically connected to a plurality of third thin-film transistors 124 and a plurality of fourth thin-film transistors 125. Drain terminals of the third thin-film transistors 124 are electrically connected to the odd row touch data signal lines 112, and drain terminals of the fourth thin-film transistors 125 are electrically connected to the even row touch data signal lines 113.

The touch array substrate 100 has three states, namely, a display sleep state, a display state, and a touch scanning state. The display state is an operation mode where the driving circuit layer 11 is in a working state, and has an activated circuit path for displaying. The display sleep state also known as the black screen state, is an operation mode where the driving circuit layer 11 is in a non-working state, and does not have any activated circuit path for displaying. The touch scanning state is an operation mode where the touch layer 12 is in a working state and transmits touch data signals.

In the display sleep state, the sleep state voltage equalizing connecting unit 13 enables mutual electrical connection of the odd row driving data signal lines 122, the even row driving data signal lines 123, the odd row touch data signal lines 112, and the even row touch data signal lines 113.

As shown in FIG. 6, the data signals (SD) are shown as D(n+1), D(n+2), D(n+3), and D(n+4). The touch signals (TP) are shown as TP(n+1), TP(n+2), TP(n+3), and TP(n+4).

In the embodiment, the sleep state voltage equalizing connecting unit 13 comprises a fifth thin-film transistor 131, a sixth thin-film transistor 132, and at least one seventh thin-film transistor 133.

Specifically, a source terminal of the fifth thin-film transistor 131 is connected to the odd row driving data signal lines 122, and a drain terminal of the fifth thin-film transistor 131 is connected to the odd row touch data signal lines 112. A source terminal of the sixth thin-film transistor 132 is connected to the even row driving data signal lines 123, and a drain terminal of the sixth thin-film transistor 132 is connected to the even row touch data signal lines 113. A source terminal of the at least one seventh thin-film transistor 133 is connected to the odd row driving data signal lines 122 or the odd row touch data signal lines 112, and a drain terminal of the at least one seventh thin-film transistor 133 is connected to the even row driving data signal lines 123 or the even row touch data signal lines 113. In the embodiment, a plurality of the seventh thin-film transistors 133 are provided to enable mutual electrical connection of the odd row driving data signal lines 122, the even row driving data signal lines 123, the odd row touch data signal lines 112, and the even row touch data signal lines 113.

The data signal lines of the fifth thin-film transistor 131, the sixth thin-film transistor 132, and the seventh thin-film transistor 133 are all connected to a switch driving line 134 (TP-SW). The switch driving line 134 is connected to a driving integrated circuit. The switch driving line 134 is connected to a signal in the display sleep state to enable mutual electrical connection of the odd row driving data signal lines 122, the even row driving data signal lines 123, the odd row touch data signal lines 112, and the even row touch data signal lines 113.

In the display phase and the touch scanning phase, the switch driving line 134 is connected to a signal to make the sleep state voltage equalizing connecting unit 13 enable mutual electrical insulation of the odd row driving data signal lines 122, the even row driving data signal lines 123, the odd row touch data signal lines 112, and the even row touch data signal lines 113.

In the embodiment, the first thin-film transistor 114, the second thin-film transistor 115, the third thin-film transistor 124, the fourth thin-film transistor 125, the fifth thin-film transistor 131, the sixth thin-film transistor 132, and the seventh thin-film transistor 133 may comprise a trench metal oxide semiconductor (NMOS), a P trench metal oxide semiconductor (PMOS), or a complementary metal oxide semiconductor (CMOS) transmission gate.

Figure 7:
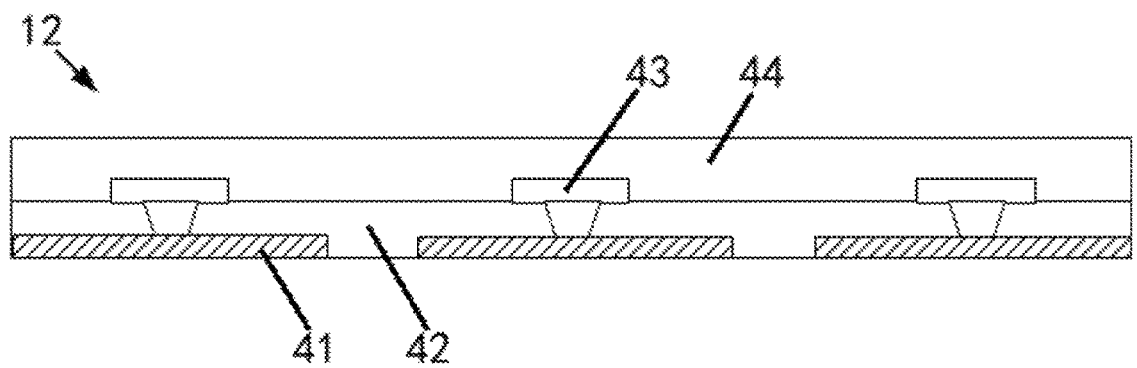
FIG. 7 is a diagram showing a structure of a touch layer in an embodiment of the present invention.

With cross reference to FIGS. 6 and 7, the touch layer 12 comprises a layered structure of a touch electrode wire layer 41, an insulation layer 42, a self-capacitive touch electrode layer 43, and a passivation layer 44. Specifically, a touch electrode wire layer 41 is located on the driving circuit layer 11. The insulation layer 42 is located on the touch electrode wire layer 41. A through hole is formed on the insulation layer 42. The self-capacitive touch electrode layer 43 is located on the insulation layer 42 and extended through the through hole to be electrically connected to the touch electrode wire layer 41. The self-capacitive touch electrode layer 43 comprises the odd row touch data signal lines 112 and the even row touch data signal lines 113. The passivation layer 44 is located on the self-capacitive touch electrode layer 43 to provide insulation.

Figure 8:
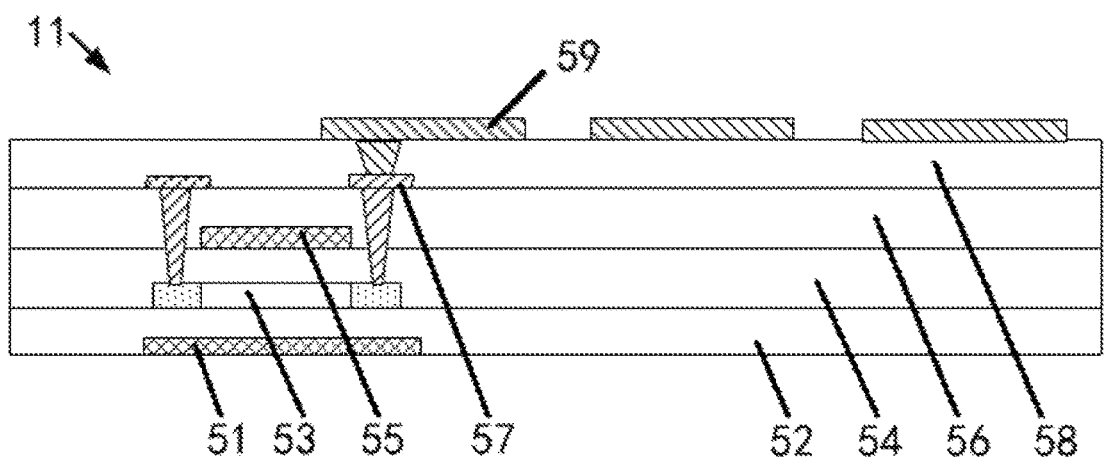
FIG. 8 is a showing a structure of a driving circuit layer in an embodiment of the present invention.

With reference to FIG. 8, the driving circuit layer 11 includes a blackout layer 51, a buffer layer 52, an active layer 53, a gate insulation layer 54, a gate layer 55, an interlayer insulation layer 56, a source drain layer 57, a flat layer 58, and a pixel electrode layer 59. Specifically, the buffer layer 52 is located on the blackout layer 51. The active layer 53 is located on the buffer layer 52. The gate insulation layer 54 is located on the active layer 53. The gate layer 55 is located on the gate insulation layer 54, and includes the driving scanning lines 121. The interlayer insulation layer 56 is located on the gate layer 55. The source drain layer 57 is located on the interlayer insulation layer 56. The flat layer 58 is located on the source drain layer 57. The pixel electrode layer 59 is located on the flat layer 58, and includes the odd row driving data signal lines 122 and the even row driving data signal lines 123.

Figure 1:
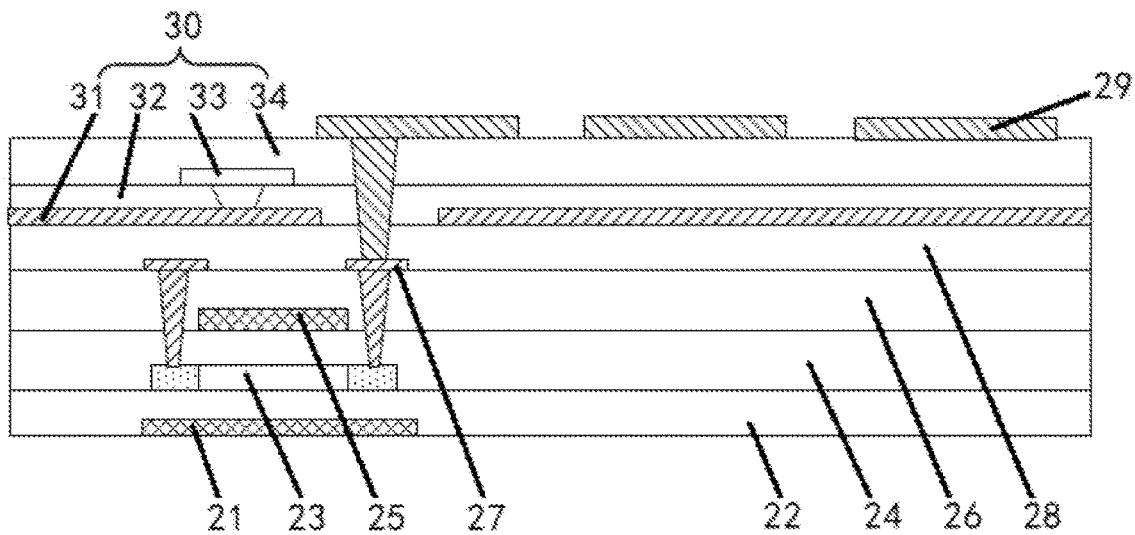
FIG. 1 is a cross-sectional view showing a structure of an existing in-cell touch array substrate.
Figure 2:
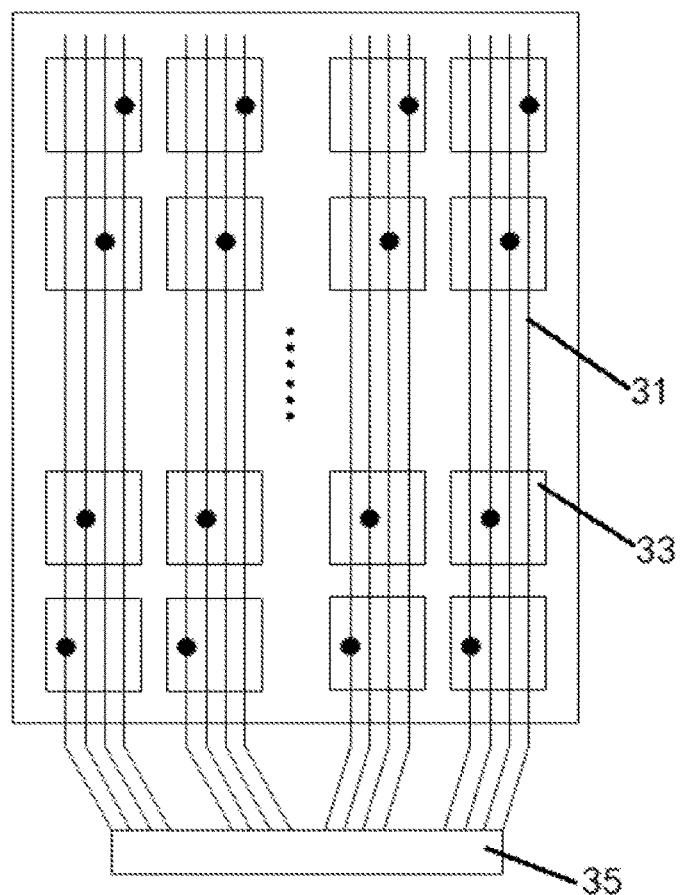
FIG. 2 is planar view showing a structure of an existing in-cell touch array substrate.
Figure 3:
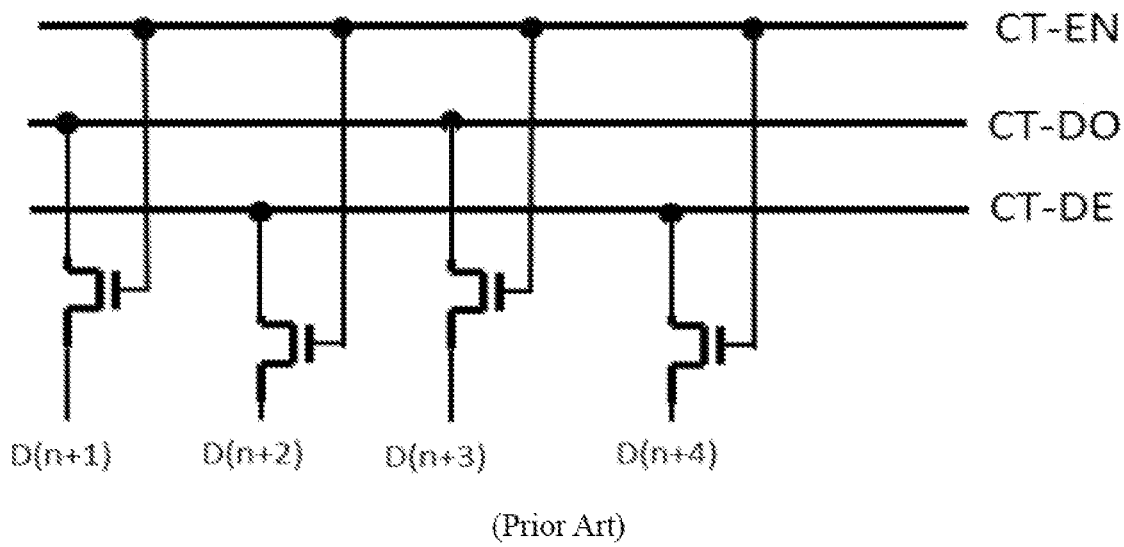
FIG. 3 is a diagram showing a structure of the driving circuit of an existing in-cell touch array substrate.
Figure 4:
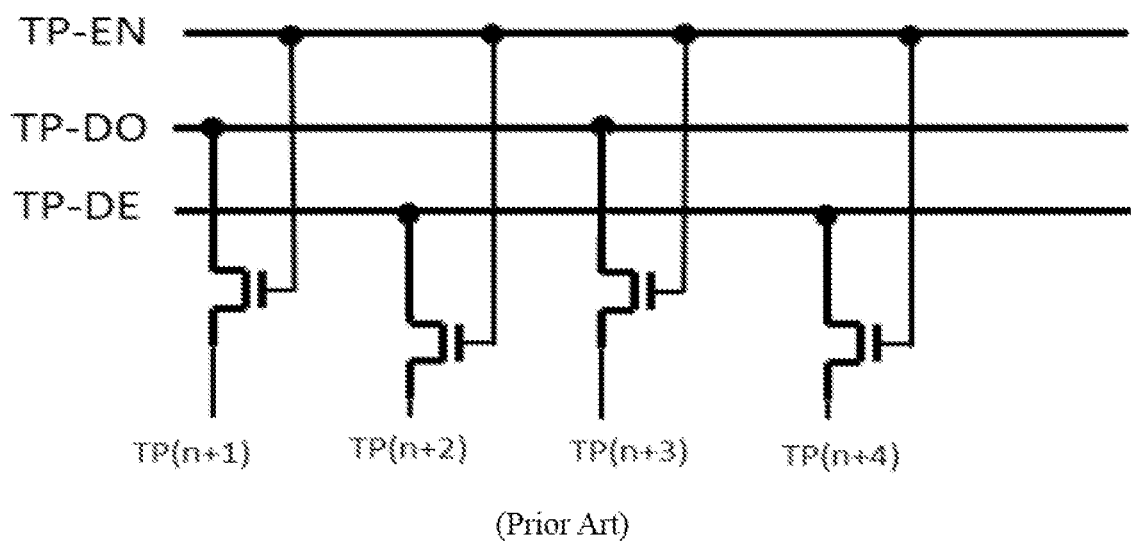
FIG. 4 is a diagram showing a structure of the touch circuit of an existing in-cell touch array substrate.

In an alternative embodiment, the touch layer 12 is disposed between the flat layer 58 and the pixel electrode layer 59 of the driving circuit layer 11 to integrate the touch panel function with the LCD (in-cell), and thus to realize thinness. The arrangement belongs to existing technology, so can be appreciated with reference to FIG. 1.

Based on the same invention, a touch display including the described touch array substrate 100 is provided.

Operation of the touch display provided by this embodiment is consistent with the embodiments of the above-mentioned touch array substrate 100, and specific structural and working principles may be referenced to the embodiments of the touch array substrate 100, which is not repeated here.

Based on the same invention, an embodiment of the invention provides a display device including the described touch display The display device may be a tablet, a television, a monitor, a laptop, a digital photo frame, a navigator, or any product or component with display function.

The beneficial effects of the present invention are: the present invention provides a touch array substrate 100, a touch display and display device. A sleep state voltage equalizing connecting unit 13 is formed by adding a set of TFT (131, 132, and 133) and a switch driving line (TP-SW) 134 to the circuit of the touch array substrate 100. The switch driving line TP-SW is connected from the driving integrated circuit. The touch scanning line (TP-EN) 111, odd row touch data signal line (TP-DO) 112, and even-row touch data signal line (TP-DE) 113 provide touch signal (TP) or public voltage signal (VCOM) on the touch display. The driving scanning line (CT-EN) 121, the odd row driving data signal lines (CT-DO) 121, the even row driving data signal lines (CT-DE) 123 to provide display data signals (SD). After the touch display enters the display sleep state, the LCD display to enable conductivity of the added TFT via TP-SW, electrically connects all of CT-DO, CT-DE, TP-DO and TP-DE together, and connects a signal to TFT of touch array substrate 100 using CT-EN and TP-EN, thus to connect the source drain layer 57 to the self-capacitive touch electrode 43. This ensures that voltage level on the common voltage signal (VCOM) is identical to the voltage level on the data signal (SD), avoiding the problem of low grayscale whitening and screen flicker due to the voltage difference.

The foregoing is only the preferred embodiments of the invention, it shall be noted that a person with ordinary skills in the art without departing from the principles of the present invention, may also make certain improvements and modifications, which should be also regarded as in the claims of the present invention.

What is claimed is:

1. A touch array substrate comprising:
a mutually insulated driving circuit layer;
a touch layer; and
a sleep state voltage equalizing connecting unit;
wherein the driving circuit layer comprises driving scanning lines, odd row driving data signal lines, and even row line driving data signal lines, the driving scanning lines are electrically connected to a plurality of first thin-film transistors and a plurality of second thin-film transistors, drain terminals of the first thin-film transistors are electrically connected to the odd row driving data signal lines, and drain terminals of the second thin-film transistors are electrically connected to the even row driving data signal lines;
wherein the touch layer comprises touch scanning lines, odd row touch data signal lines, and even row touch data signal lines, the touch scanning lines are electrically connected to a plurality of third thin-film transistors and a plurality of fourth thin-film transistors, drain terminals of the third thin-film transistors are electrically connected to the odd row touch data signal lines, and drain terminals of the fourth thin-film transistors are electrically connected to the even row touch data signal lines; and
wherein in a display sleep state, the sleep state voltage equalizing connecting unit enables mutual electrical connection of the odd row driving data signal lines, the even row driving data signal lines, the odd row touch data signal lines, and the even row touch data signal lines.

2. The touch array substrate of claim 1, wherein the sleep state voltage equalizing connecting unit comprises:
a fifth thin-film transistor of which a source terminal is connected to the odd row driving data signal lines, and a drain terminal is connected to the odd row touch data signal lines;
a sixth thin-film transistor of which a source terminal is connected to the even row driving data signal lines, and a drain terminal is connected to the even row touch data signal lines;
at least one seventh thin-film transistor, of which a source terminal is connected to the odd row driving data signal lines or the odd row touch data signal lines, and a drain terminal is connected to the even row driving data signal lines or the even row touch data signal lines;
wherein data signal lines of the fifth thin-film transistor, the sixth thin-film transistor and the seventh thin-film transistor are all connected to a switch driving line, and the switch driving line is connected to a signal in display sleep state to enable mutual electrical connection of the odd row driving data signal lines, the even row driving data signal lines, the odd row touch data signal lines, and the even row touch data signal lines.

3. The touch array substrate of claim 2, wherein the switch driving line is connected to a driving integrated circuit.

4. The touch array substrate of claim 1, wherein the touch layer is located on one side of the driving circuit layer, and the sleep state voltage equalizing connecting unit is located on one side of the touch layer that is away from the driving circuit layer.

5. The touch array substrate of claim 1, wherein the touch layer is located on one side of the driving circuit layer, and the sleep state voltage equalizing connecting unit is located on one side of the driving circuit layer that is away from the touch layer.

6. The touch array substrate of claim 1, wherein a transistor selected from the first thin-film transistors, the second thin-film transistors, the third thin-film transistors, the fourth thin-film transistors, the fifth thin-film transistor, the sixth thin-film transistor, and the seventh thin-film transistor comprise a trench metal oxide semiconductor, a P trench metal oxide semiconductor, or a complementary metal oxide semiconductor transmission gate.

7. The touch array substrate of claim 1, wherein in a display state and in a touch scanning state, the switch driving line is connected to a signal, to make the sleep state voltage equalizing connecting unit enable mutual electrical insulation of the odd row driving data signal lines, the even row driving data signal lines, the odd row touch data signal lines, and the even row touch data signal lines.

8. The touch array substrate of claim 1, wherein the touch layer comprises:
- a touch electrode wire layer located on the driving circuit layer;
- an insulation layer located on the touch electrode wire layer, provided with a through hole;
- a self-capacitive touch electrode layer located on the insulation layer and extended through the through hole to be electrically connected to the touch electrode wire layer, wherein the self-capacitive touch electrode layer comprises the odd row touch data signal lines and the even row touch data signal lines; and
- a passivation layer located on the self-capacitive touch electrode layer.

9. The touch array substrate of claim 1, wherein, the driving circuit layer includes:
- a blackout layer;
- a buffer layer located on the blackout layer;
- an active layer located on the buffer layer;
- a gate insulation layer located on the active layer;
- a gate layer located on the gate insulation layer, comprising the driving scanning lines;
- an interlayer insulation layer located on the gate layer;
- a source drain layer located on the interlayer insulation layer;
- a flat layer located on the source drain layer; and
- a pixel electrode layer located on the flat layer, comprising the odd row driving data signal lines and the even row driving data signal lines;

wherein the touch layer is located between the flat layer and the pixel electrode layer.

10. A touch display comprising a touch array substrate of claim 1.

11. A display device comprising a touch display of claim 10.

* * * * *

UNITED STATES PATENT AND TRADEMARK OFFICE
CERTIFICATE OF CORRECTION

| | |
|---|---|
| PATENT NO. | : 11,175,772 B1 |
| APPLICATION NO. | : 16/615138 |
| DATED | : November 16, 2021 |
| INVENTOR(S) | : Qipei Zhang and Yun Yu |

It is certified that error appears in the above-identified patent and that said Letters Patent is hereby corrected as shown below:

On the Title Page

Item (30) Foreign Application Priority Data
Insert --June 24, 2019 (CN) ........................... 201910548994.3--.

Signed and Sealed this
Nineteenth Day of July, 2022

Katherine Kelly Vidal
*Director of the United States Patent and Trademark Office*